(12) United States Patent
Wilcox et al.

(10) Patent No.: US 10,797,555 B2
(45) Date of Patent: Oct. 6, 2020

(54) ELECTRICAL DISCHARGE PREVENTION IN BEARING FOR SUBMERSIBLE PUMP MOTOR USING A CONDUCTIVE SPRING BETWEEN A SLEEVE AND A CARRIER BODY

(71) Applicant: Baker Hughes, a GE Company, LLC, Houston, TX (US)

(72) Inventors: Spencer Wilcox, Claremore, OK (US); James Clingman, Broken Arrow, OK (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 319 days.

(21) Appl. No.: 15/793,808

(22) Filed: Oct. 25, 2017

(65) Prior Publication Data
US 2019/0123609 A1    Apr. 25, 2019

(51) Int. Cl.
*H02K 5/124* (2006.01)
*F04D 13/08* (2006.01)
(Continued)

(52) U.S. Cl.
CPC ............. *H02K 5/124* (2013.01); *F04D 13/08* (2013.01); *F04D 13/10* (2013.01); *F04D 29/047* (2013.01);
(Continued)

(58) Field of Classification Search
CPC ........ H02K 5/124; H02K 5/167; H02K 5/161; H02K 5/132; H02K 5/12; H02K 5/1285;
(Continued)

(56) References Cited

U.S. PATENT DOCUMENTS 2,747,948 A * 5/1956 Jergens .................... F16C 33/78
                                                          384/482
4,521,708 A * 6/1985 Vandevier .............. H02K 5/132
                                                          310/87
(Continued)

FOREIGN PATENT DOCUMENTS

CN         103321569 A    9/2013
JP         2004266985 A   9/2004
(Continued)

OTHER PUBLICATIONS

International Search Report for PCT/US2018/052622, dated Mar. 29, 2019.

*Primary Examiner* — Maged M Almawri
(74) *Attorney, Agent, or Firm* — Bracewell LLP; James E. Bradley

(57) ABSTRACT

A submersible pump electrical motor has a bearing sleeve between first and second rotor sections and mounted to the shaft for rotation in unison. An insert sleeve surrounds the bearing sleeve. A carrier body surrounds the insert sleeve. A carrier anti-rotation ring on an outer diameter of the carrier body engages the bore of the stator. First and second seal rings are axially spaced apart from each other between an outer diameter of the insert sleeve and an inner diameter of the carrier body. A hole in the carrier body has an inner end at the inner diameter of the carrier body. An electrically conductive coil spring within the hole has an inner end protruding through the inner end of the hole into contact with the outer diameter of the insert sleeve, creating electrical continuity between the insert sleeve and the carrier body.

18 Claims, 2 Drawing Sheets

(51) Int. Cl.
  *H02K 5/16* (2006.01)
  *H02K 5/167* (2006.01)
  *F16C 17/00* (2006.01)
  *H02K 5/132* (2006.01)
  *F04D 29/047* (2006.01)
  *F04D 13/10* (2006.01)
  *F16C 17/02* (2006.01)

(52) U.S. Cl.
  CPC .............. *F16C 17/00* (2013.01); *F16C 17/02* (2013.01); *H02K 5/132* (2013.01); *H02K 5/161* (2013.01); *H02K 5/167* (2013.01); *F16C 2352/00* (2013.01)

(58) Field of Classification Search
  CPC ........ H02K 5/1287; H02K 5/136; H02K 5/15; H02K 5/16; H02K 5/163; H02K 5/165; H02K 5/1672; H02K 5/1677; H02K 5/1675; H02K 5/24; H02K 11/00; H02K 11/40; F04D 13/08; F04D 13/10; F16C 17/00; F16C 17/02; F16C 2352/00
  USPC .... 310/89, 87, 88, 90, 91; 417/410.1, 423.1, 417/423.3, 423.12, 423.13
  See application file for complete search history.

(56) References Cited

U.S. PATENT DOCUMENTS

| | | | |
|---|---|---|---|
| 4,585,963 A | 4/1986 | Wilkinson, Jr. et al. | |
| 4,605,316 A * | 8/1986 | Utecht | F16C 17/03 384/215 |
| 4,621,991 A * | 11/1986 | Smith | A47L 9/22 310/239 |
| 5,795,075 A * | 8/1998 | Watson | E21B 4/003 384/215 |
| 6,091,175 A * | 7/2000 | Kinsinger | F16C 27/063 277/438 |
| 6,300,699 B1 | 10/2001 | Parmeter | |
| 6,424,066 B1 * | 7/2002 | Watson | F04D 29/047 175/92 |
| 6,566,774 B2 * | 5/2003 | Parmeter | H02K 5/1672 310/87 |
| 6,686,673 B1 | 2/2004 | Komura et al. | |
| 6,940,193 B2 * | 9/2005 | Hoffmann | G11B 19/2009 310/67 R |
| 6,956,310 B1 * | 10/2005 | Knox | H02K 5/132 310/87 |
| 7,625,121 B2 * | 12/2009 | Pettinato | F16C 17/03 384/117 |
| 7,780,424 B2 | 8/2010 | Parmeter | |
| 7,808,140 B2 * | 10/2010 | Cain | F04D 13/10 310/90 |
| 7,950,068 B2 | 5/2011 | Chang | |
| 8,342,821 B2 * | 1/2013 | Prieto | F04D 29/044 417/423.12 |
| 8,567,042 B2 * | 10/2013 | Neuroth | F16C 17/04 29/596 |
| 8,726,503 B2 * | 5/2014 | Pettinato | F16C 17/03 29/889.2 |
| 8,910,718 B2 * | 12/2014 | Watson | E21B 43/128 166/105 |
| 8,987,957 B2 * | 3/2015 | Knapp | H02K 7/08 310/87 |
| 9,397,547 B2 * | 7/2016 | Neuroth | F16C 17/04 |
| 9,482,282 B2 * | 11/2016 | Maciver | F16C 17/02 |
| 9,531,230 B2 | 12/2016 | Parmeter | |
| 9,790,988 B1 * | 10/2017 | Larson | F16C 17/02 |
| 9,941,770 B2 * | 4/2018 | Rumbaugh | H02K 7/08 |
| 9,951,810 B2 * | 4/2018 | Parmeter | F16C 19/38 |
| 2002/0125777 A1 | 9/2002 | Parmeter et al. | |
| 2010/0166578 A1 | 7/2010 | Watson | |
| 2015/0188384 A1 * | 7/2015 | Rumbaugh | H02K 7/08 310/90 |
| 2016/0111941 A1 | 4/2016 | Sturm et al. | |
| 2016/0233636 A1 * | 8/2016 | Fukumoto | H01R 39/12 |
| 2019/0186571 A1 * | 6/2019 | Takahashi | F16F 1/047 |

FOREIGN PATENT DOCUMENTS

| | | |
|---|---|---|
| JP | 2006145002 A | 6/2006 |
| JP | 2012228137 A | 11/2012 |
| WO | 2012138501 A2 | 10/2012 |

* cited by examiner

ELECTRICAL DISCHARGE PREVENTION IN BEARING FOR SUBMERSIBLE PUMP MOTOR USING A CONDUCTIVE SPRING BETWEEN A SLEEVE AND A CARRIER BODY

FIELD OF THE DISCLOSURE

This disclosure relates in general to submersible well pump motors and in particular to a motor bearing having an insert sleeve grounded by coil spring to a carrier body body.

BACKGROUND

Electrical submersible pump (ESP) motors can be very long and small in diameter. To obtain sufficient horsepower, multiple rotor sections are mounted on the same shaft inside the stator with radial support bearings between each rotor section and on each end of the rotor stack. These bearings comprise a bearing sleeve mounted on and rotating with the shaft and a corresponding carrier body in frictional engagement with the inside diameter of the stator. A thrust washer is usually placed on opposite ends of the rotor carrier bearing between the carrier bearing and the adjacent rotor sections.

In one type, an insert sleeve is located between the bearing sleeve and the carrier body to reduce vibrations from being transferred from the shaft to the stator. The insert sleeve has elastomeric rings on its outer diameter that engage the inner diameter of the carrier body. Lubricant ports in the shaft, bearing sleeve and insert sleeve cause a film of lubricant to exist in the small annular spaces on the inner and outer diameters of the insert sleeve. The insert sleeve does not rotate, but is able to move radially in very slight amounts relative to the carrier body. Ports in the insert sleeve meter lubricant flow between its inner and outer diameters.

During operation, the three-phase electrical power supplied to the stator can cause a static electrical charge to build up on the insert sleeve. This electrical charge can discharge from time to time, creating an arc that can damage the seal rings on the insert sleeve.

SUMMARY

A submersible pump electrical motor comprises a stator having a bore. A shaft with rotor sections extends through the bore along an axis of the motor. A bearing sleeve is mounted to the shaft for rotation in unison between adjacent rotor sections. An insert sleeve has an inner diameter that receives the bearing sleeve. A carrier body has an inner diameter that receives the insert sleeve. A carrier anti-rotation member on an outer diameter of the carrier body engages the bore of the stator, preventing rotation of the carrier body relative to the stator. First and second rings between an outer diameter of the insert sleeve and the inner diameter of the carrier body prevent rotation of the insert sleeve relative to the carrier body. An electrically conductive spring is in engagement with the insert sleeve and with the carrier body, creating electrical continuity between the insert sleeve and the carrier body.

In the embodiment shown, the spring comprises a coiled member biased into contact with the outer diameter of the insert sleeve. Also, in the embodiment shown, the carrier body has a radially extending hole that has an opening at the inner diameter of the carrier body. The spring has an outer end within the hole and an inner end extending through the opening into contact with the outer diameter of the insert sleeve. The spring has an outer end in contact with an inward facing shoulder in the hole and an inner end extending through the hole into contact with the outer diameter of the insert sleeve.

The shoulder may be on a removable retainer secured within an outer portion of the hole. The spring comprises a coiled member biased between the retainer and the outer diameter of the insert sleeve. The retainer may be a roll pin frictionally secured within an outer portion of the hole. During assembly, the spring is inserted into the hole from the outer diameter of the sleeve insert, and the retainer is installed afterward.

In the example shown, the hole has an opening in the inner diameter of the carrier body. The opening is closer to a first end of the carrier body than a second end of the carrier body. Also, the opening of the hole is axially between the first and second rings. This placement of the hole facilitates installing the insert sleeve in the carrier body without damaging the seal rings on the insert sleeve.

BRIEF DESCRIPTION OF THE DRAWINGS

So that the manner in which the features, advantages and objects of the disclosure, as well as others which will become apparent, are attained and can be understood in more detail, more particular description of the disclosure briefly summarized above may be had by reference to the embodiment thereof which is illustrated in the appended drawings, which drawings form a part of this specification. It is to be noted, however, that the drawings illustrate only a preferred embodiment of the disclosure and is therefore not to be considered limiting of its scope as the disclosure may admit to other equally effective embodiments.

DETAILED DESCRIPTION OF THE DISCLOSURE

Figure 1:
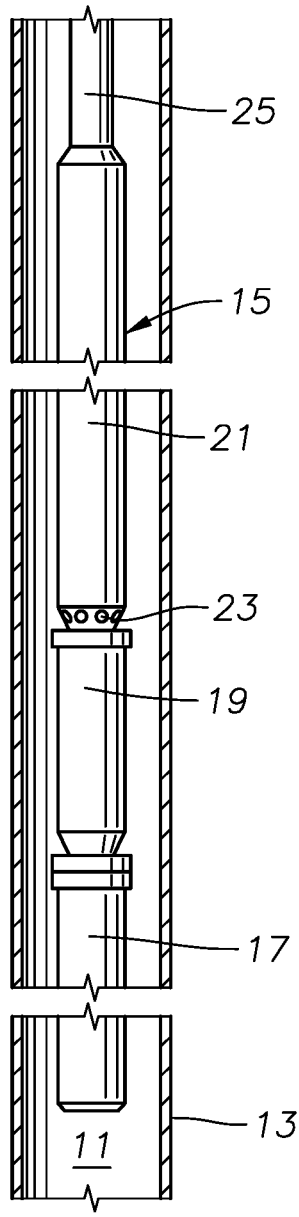
FIG. 1 is a side view of an electrical submersible pump assembly in accordance with this disclosure and installed in a well.

The methods and systems of the present disclosure will now be described more fully hereinafter with reference to the accompanying drawings in which embodiments are shown. The methods and systems of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Referring to FIG. 1, a well 11 has casing 13 that is perforated or has other openings to admit well fluid. An electrical submersible pump assembly (ESP) 15 is suspended in well 11 to pump well fluid from well 11. Although shown installed vertically, ESP 15 could be located within an inclined or horizontal section of well 11 or it could be located exterior of well 11 for boosting the pressure of well fluid flowing from the well.

ESP 15 includes a motor 17, normally a three-phase electrical motor. A seal section or pressure equalizer 19 connects to motor 17 if ESP 15 is submersed. Seal section 19 has components, such as a bladder or bellows, for reducing a pressure differential between dielectric lubricant contained in motor 17 and the hydrostatic pressure of the well fluid in well 11. Although shown above motor 17, the pressure equalizing components of seal section 19 could be mounted to a lower end of motor 17.

A pump 21 connects to the opposite end of seal section 19. Pump 21 may be a centrifugal pump with numerous stages, each stage having an impeller and a diffuser. Alternately, pump 21 may be a progressing cavity pump, having a helical rotor that rotates within an elastomeric stator. Pump 21 could also be a reciprocating type. Pump 21 has an intake 23 for drawing in well fluid. A gas separator (not shown) may be mounted between motor 17 and pump 21, and if so, intake 23 would be located in the gas separator. A string of production tubing 25 suspends ESP 15 in casing 13 in most installations.

Figure 3:
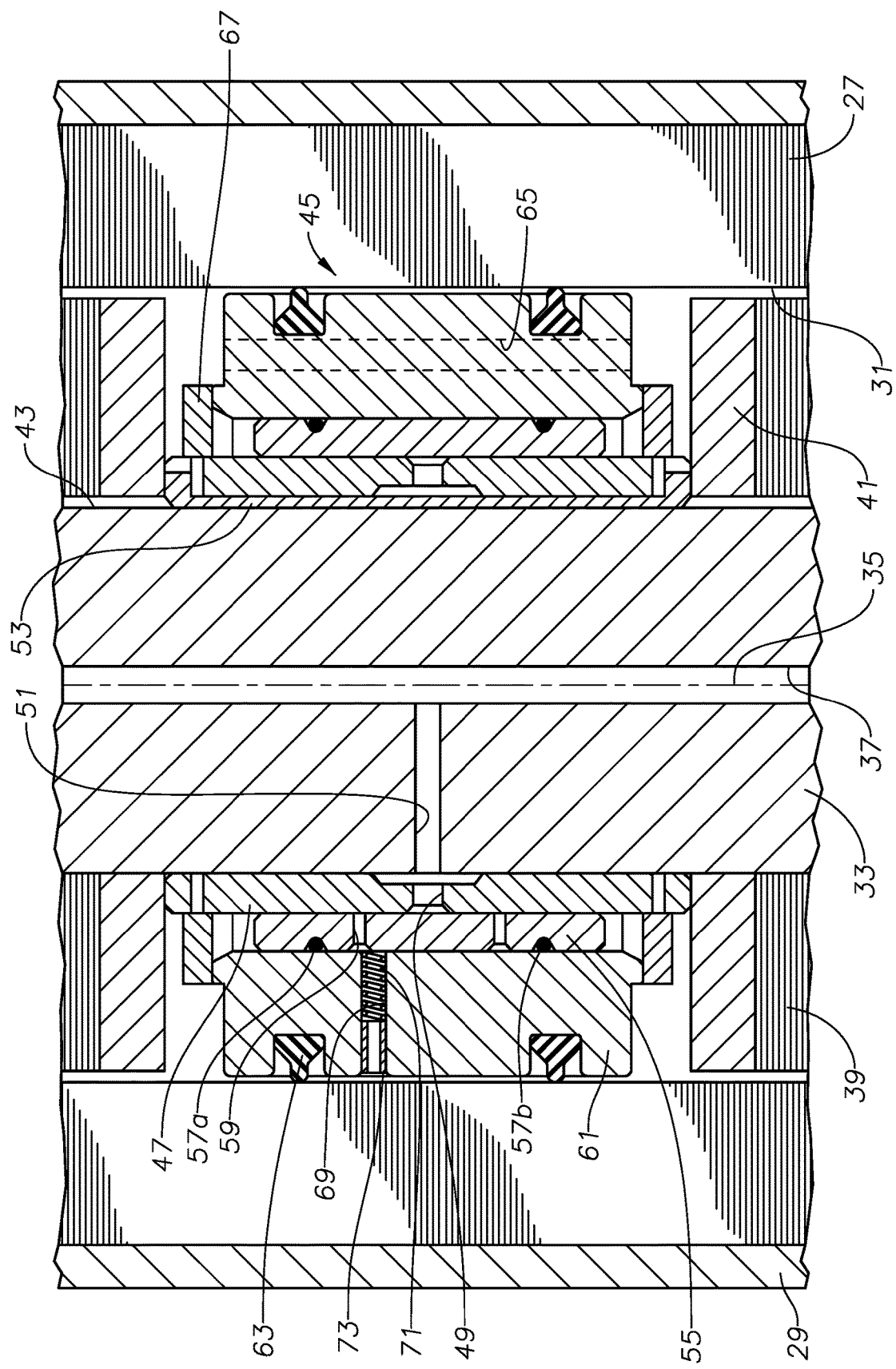
FIG. 3 is sectional view of the radial bearing of FIG. 2 and portions of the motor.

Referring to FIG. 3, motor 17 has a stator 27 that is fixed in a motor housing 29. Stator 27 may be conventional and is made up of a plurality of laminations, which are thin steel disks having slots through which windings (not shown) are inserted. Stator 27 has an inner diameter or bore 31.

A shaft 33 extends through stator bore 31 along a longitudinal axis 35. Shaft 33 may have an axial passage 37 for distributing a dielectric lubricant. Several rotor sections 39 are mounted to shaft 33 for rotation therewith, and portions of two of the rotor sections 39 are shown. Each rotor section 39 may be conventional and is made up of laminations, which are also steel disks. Copper rods (not shown) extend axially through the rotor laminations and are spaced around axis 35. The rotor laminations and the ends of the copper rods are secured together by a copper end ring 41 at each end of each rotor section 39. An axially extending keyway 43 extends along the inner diameter of each rotor section 39 and on shaft 33 for receiving a key (not shown) to cause rotor sections 39 to rotate with shaft 33. Rotor sections 39 may be free to move small increments axially relative to shaft 33 in response to thermal growth. As an example only, each rotor section 39 may be about a foot or so in length, and motor 17 may be up to 30 feet in length or more.

A radial bearing 45 locates between each of the rotor sections 39 to radially stabilize shaft 33 during rotation. Radial bearing 45 may have various configurations, and the one shown in FIG. 2 includes a bearing sleeve 47 mounted to shaft 33 for rotation in unison. Bearing sleeve 47 is free to slide axially on shaft 33 a small increment. In this example, bearing sleeve 47 has one or more transverse lubricant ports 49 extending from its inner diameter to its outer diameter. Lubricant port 49 is in fluid communication with a shaft lubricant port 51. Lubricant flowing through shaft axial passage 37 flows through shaft and sleeve lubricant ports 49, 51 for lubricating radial bearing 45. A key 53 has radially outward extending fingers at its ends that engage notches or apertures in bearing sleeve 47 to cause bearing sleeve 47 to rotate with shaft 33.

The upper end of bearing sleeve 47 abuts end ring 41 of the next upward rotor section 39, and the lower end of bearing sleeve 47 abuts end ring 41 of the next lower rotor section 39. The terms "upper", "lower" and the like are used only for convenience since motor 17 could be oriented horizontally during operation. Bearing sleeve 47 thus fixes the axial distance between end rings 41 of adjacent rotor sections 39.

A non rotating cylindrical insert sleeve 55 surrounds and closely receives bearing sleeve 47. Insert sleeve 55 has two axially spaced apart rings 57a, 57b, which in this example are elastomeric seal rings, within annular grooves on its outer diameter. Lubricant ports 59 extend from the inner to the outer diameters of insert sleeve 55 to allow lubricant flow. Lubricant ports 59 are located axially between the two seal rings 57a, 57b.

An annular carrier body 61 has a central bore or inner diameter that closely receives the outer diameter of insert sleeve 55 and is frictionally engaged by seal rings 57. Carrier body 61 has an outer diameter slightly smaller than stator bore 31. A pair of anti-rotation rings 63 are mounted in grooves on the outer diameter of carrier body 61. Anti-rotation rings 63 frictionally engage stator bore 31. Anti-rotation rings 63 may be elastomeric rings as shown, or coiled springs or other devices to prevent rotation of carrier body 61 relative to stator 27. Axial lubricant flow passages 65 are spaced in an array around carrier body 61 parallel with axis 35. Flow passages 65 extend between opposite ends of carrier body 61. Thrust washers 67, shown schematically, are located between the upper end of carrier body 61 and the end ring 41 of the next upward rotor section 39 as well as between the lower end of carrier body 61 and the end ring 41 of the next lower rotor section 39.

The axial length of carrier body 61 is less than the axial length of bearing sleeve 47. Also, in this example, the axial length of carrier body 61 is greater than the axial length of insert sleeve 55. Retainer rings (not shown) may be employed in the inner diameter of carrier body 61 to keep insert sleeve 55 axially centered within carrier body 61.

Figure 2:
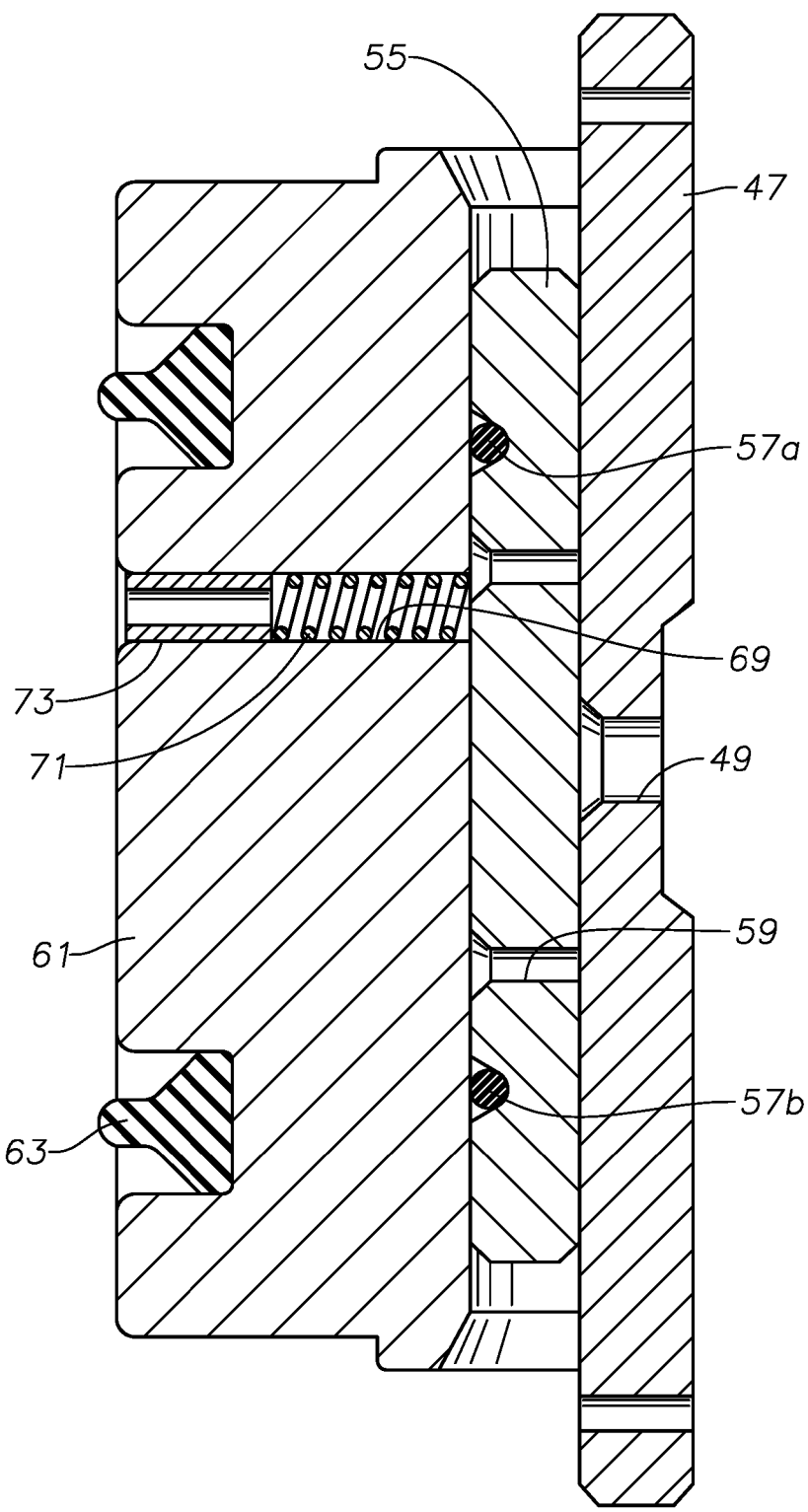
FIG. 2 is a partial sectional view of one of the radial motor bearings of the motor of the pump assembly of FIG. 1, shown removed from the motor.

Referring also to FIG. 2, a hole 69 extends radially through carrier body 61. Hole 69 is cylindrical, has an outer end at the outer diameter of carrier body 61 and an inner end at the inner diameter of carrier body 61. A coil spring 71 is located within hole 69. Coil spring 71 is of a material, such as 302 stainless steel, that is electrically conductive and preferably either non-magnetic or has low magnetic characteristics.

A retainer or roll pin 73 is secured within an outer portion of hole 69 on an outer end of coil spring 71. Roll pin 73 is conventional and also preferably formed of an electrically conductive material that has low or no magnetic characteristics. Roll pin 73 is cylindrical and may have an open passage through it. Roll pin 73 defines an inward facing shoulder against which an outer end of coil spring 71 contacts. An inner end of coil spring 71 protrudes out the inner end of hole 69 into contact with the outer diameter of insert sleeve 55. The length of coil spring 73 is greater than the distance from roll pin 73 to the outer diameter of insert sleeve 55, causing coil spring 73 to be compressed or biased by roll pin 73 against the outer diameter of insert sleeve 55. The frictional engagement of coil spring 71 with insert sleeve 55, roll pin 73, and carrier body 61 places insert sleeve 55 in electrical continuity with carrier body 61, which has a much larger mass than insert sleeve 55.

The inner end of hole 69 is closer to one of the ends of carrier body 61 than the other. In the example shown, the inner end of hole 69 is closer to the upper end than the lower end, but that arrangement could be reversed. Also, the inner end of hole 69 is axially between seal rings 57a, 57b. In this example, the inner end of hole 69 is closer to upper seal ring 57a than lower seal ring 57b. The inner end of hole 69 preferably does not register with any of the lubricant ports 59 in insert sleeve 55.

A reason for positioning hole 69 closer to one end than the other of carrier body 61 has to do with a method of assembling bearing 45. In this method, the technician avoids sliding either seal ring 57a, 57b across the inner end of hole 59 while pushing insert sleeve 55 into carrier body 61. The technician installs lower seal ring 57b in its groove on insert sleeve 55 while the annular groove of upper seal ring 57a remains empty. The technician then pushes the upper end of insert sleeve 55 into the lower end carrier body 61 until the empty annular groove for upper seal ring 57a is exposed above the upper end of carrier body 61. In this position, lower seal ring 57b will be in the inner diameter of carrier body 61 just below hole 69. The technician then installs upper seal ring 57a in its annular groove and pushes insert sleeve 55 back downward to a final position with the axial center of insert sleeve 55 aligned with the axial center of carrier body 61. The technician then inserts coil spring 71 into the outer end of hole 69 and presses roll pin 73 in the outer portion of hole 69.

During operation, three phase electrical power supplied to stator 27 causes rotor sections 39, shaft 33 and bearing sleeve 47 to rotate. Seal rings 57a, 57b and anti-rotation rings 63 prevent insert sleeve 55 and carrier body 61 from rotating. Coil spring 71 maintains carrier body 61 and insert sleeve 55 in electrical continuity with each other. The continuity prevents a static electrical buildup from occurring on insert sleeve 55. A static electrical buildup could otherwise discharge to carrier body 61 and cause damage to seal rings 57a, 57b.

A small clearance exists between the outer diameter of bearing sleeve 47 and the inner diameter of insert sleeve 55. Also, a small clearance exists between the outer diameter of insert sleeve 55 and the inner diameter of carrier body 61, During operation, these clearances fill with lubricant flowing through shaft axial passage 37, shaft lubricant port 51, bearing sleeve ports 49, insert sleeve ports 59. The lubricant films created provide shock absorption to reduce vibration of shaft 33 from being transferred through insert sleeve 55 to carrier body 61 and stator 27. Insert sleeve ports 59 meter flow of lubricant between the inner and outer diameters of insert sleeve 55 as insert sleeve 55 moves slightly in radial directions relative to carrier body 61. The compliant engagement of coil spring 71 with insert sleeve 55 accommodates the slight radial vibrational movement of insert sleeve 55 relative to carrier body 61. The compliance of coil spring 71 prevents coil spring 71 from transmitting vibrations of insert sleeve 55 to carrier body 61.

As motor 17 heats during operation, thermal growth can occur between shaft 33 and stator 27. Anti-rotation rings 63 tend to prevent carrier body 61 and insert sleeve 55 from axially moving with bearing sleeve 47 and rotor sections 39. As a result, one of the thrust washers 67 may contact the nearby end ring 41 to absorb thrust from the rotating end ring 41. When motor 17 is shut down, the thermal growth reverses, and the other thrust washer 67 may contact the other end ring 41.

While the disclosure has been shown in only one of its forms, it should be apparent to those skilled in the art that various changes may be made.

The invention claimed is:

1. A submersible pump electrical motor, comprising:
   a stator having a bore;
   a shaft extending through the bore along an axis of the motor;
   first and second rotor sections mounted to the shaft for rotation therewith;
   a bearing sleeve between the first and second rotor sections and mounted to the shaft for rotation in unison;
   an insert sleeve having an inner diameter that receives the bearing sleeve;
   a carrier body having an inner diameter that receives the insert sleeve;
   a carrier anti-rotation member on an outer diameter of the carrier body in engagement with the bore of the stator, preventing rotation of the carrier body relative to the stator;
   first and second seal rings sealing between an outer diameter of the insert sleeve and the inner diameter of the carrier body, preventing rotation of the insert sleeve relative to the carrier body;
   a hole within the carrier body axially between the first and second seal rings, the hole having an opening at the inner diameter of the carrier body;
   an electrically conductive spring in the hole and in engagement with the insert sleeve and with the carrier body, creating electrical continuity between the insert sleeve and the carrier body.

2. The motor according to claim 1, wherein:
   the spring comprises a coiled member biased into contact with the outer diameter of the insert sleeve.

3. The motor according to claim 1, wherein:
   the hole is radially extending; and wherein
   the spring has an outer end within the hole and an inner end extending through the opening into contact with the outer diameter of the insert sleeve.

4. The motor according to claim 1, further comprising:
   an inward facing shoulder in the hole; and wherein
   the spring has an outer end in contact with the shoulder and an inner end extending through the hole into contact with the outer diameter of the insert sleeve.

5. The motor according to claim 1, wherein:
   the hole extends radially from the outer diameter to the inner diameter of the carrier body;
   a removable retainer is secured within an outer portion of the hole; and
   the spring comprises a coiled member biased between the retainer and the outer diameter of the insert sleeve.

6. The motor according to claim 1, wherein:
   the hole extends radially from the outer diameter to the inner diameter of the carrier body;
   a roll pin is frictionally secured within an outer portion of the hole; and
   the spring comprises a coiled member biased between the roll pin and the outer diameter of the insert sleeve.

7. The motor according to claim 1, wherein:
   the hole has an opening in the inner diameter of the carrier body, the opening being closer to a first end of the carrier body than a second end of the carrier body.

8. The motor according to claim 1, wherein:
   the hole extends radially through the carrier body, the hole being closer to a first end than a second end of the carrier body, the hole having an inner end axially between the first and second rings and an outer end at the outer diameter of the carrier body;
   the spring comprises a coiled member that is inserted into the hole through the outer end of the hole; and wherein
   the motor further comprises:
   a retainer that is secured within the outer end of the hole after the coiled member has been inserted into the hole, biasing an inner end of the coiled member into contact with the outer diameter of the insert sleeve.

9. A submersible pump electrical motor, comprising:
a stator having a bore;
a shaft extending through the bore along an axis of the motor;
first and second rotor sections mounted to the shaft for rotation therewith;
a bearing sleeve axially between the first and second rotor sections and mounted to the shaft for rotation in unison;
an insert sleeve surrounding the bearing sleeve;
a carrier body surrounding the insert sleeve;
a carrier anti-rotation ring on an outer diameter of the carrier body in engagement with the bore of the stator, preventing rotation of the carrier body relative to the stator;
first and second seal rings axially spaced apart from each other, each of the first and second seal rings sealing between an outer diameter of the insert sleeve and an inner diameter of the carrier body and preventing rotation of the insert sleeve relative to the carrier body;
a hole in the carrier body having an inner end at the inner diameter of the carrier body axially between the inner and outer seal rings; and
an electrically conductive coil spring within the hole, the spring having an inner end protruding through the inner end of the hole into contact with the outer diameter of the insert sleeve, creating electrical continuity between the insert sleeve and the carrier body.

10. The motor according to claim 9, wherein the hole has an outer end at the outer diameter of the carrier body, and the motor further comprises:
a retainer secured within the outer end of the hole; and wherein
the spring is compressed between the retainer and the outer diameter of the insert sleeve.

11. The motor according to claim 9, wherein:
the hole extends radially.

12. The motor according to claim 9, wherein:
the inner end of the hole is closer to a first end of the carrier body than to a second end of the carrier body.

13. The motor according to claim 9, wherein the hole has an outer end at the outer diameter of the carrier body and the motor further comprises:
a roll pin installed in the outer end of the hole in engagement with an outer end of the coil spring to urge the inner end of the coil spring into contact with the outer diameter of the insert sleeve.

14. A submersible pump electrical motor, comprising:
a stator having a bore;
a shaft extending through the bore along an axis of the motor;
first and second rotor sections mounted to the shaft for rotation therewith;
a bearing sleeve axially between the first and second rotor sections and mounted to the shaft for rotation in unison;
an insert sleeve surrounding the bearing sleeve;
a carrier body surrounding the insert sleeve;
a carrier anti-rotation ring on an outer diameter of the carrier body in engagement with the bore of the stator, preventing rotation of the carrier body relative to the stator;
first and second seal rings axially spaced apart from each other, each of the first and second seal rings sealing between an outer diameter of the insert sleeve and an inner diameter of the carrier body and preventing rotation of the insert sleeve relative to the carrier body;
a radially extending hole in the carrier body having an inner end at the inner diameter of the carrier body;
an inward facing shoulder within the hole; and
an electrically conductive coil spring compressed between the shoulder and an outer diameter of the insert sleeve, creating electrical continuity between the insert sleeve and the carrier body.

15. The motor according to claim 14, wherein:
the hole has an outer end at the outer diameter of the carrier body, enabling the coil spring to be inserted into the hole from the outer end of the hole; and the motor further comprises:
a retainer secured within the hole after insertion of the coil spring, the retainer having an inner end that defines the inward facing shoulder.

16. The motor according to claim 14, wherein:
the hole has an outer end at the outer diameter of the carrier body, enabling the coil spring to be inserted into the hole from the outer end of the hole; and the motor further comprises:
a roll pin secured within the hole after insertion of the coil spring, the roll pin having an inner end that defines the inward facing shoulder.

17. The motor according to claim 14, wherein:
the inner end of the hole is located axially between the first and second seal rings.

18. The motor according to claim 14, wherein:
the inner end of the hole is closer to a first end of the carrier body than to a second end of the carrier body.

* * * * *